(12) United States Patent
Philbin et al.

(10) Patent No.: US 9,398,144 B2
(45) Date of Patent: Jul. 19, 2016

(54) MOBILE DEVICE MODE OF OPERATION FOR VISUALLY IMPAIRED USERS

(71) Applicant: CELLCO PARTNERSHIP, Basking Ridge, NJ (US)

(72) Inventors: David A. Philbin, Arlington, MA (US); John P. Chin, Upper Montclair, NJ (US); Yuk Lun Li, Morganville, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 73 days.

(21) Appl. No.: 14/062,445

(22) Filed: Oct. 24, 2013

(65) Prior Publication Data

US 2015/0119108 A1 Apr. 30, 2015

(51) Int. Cl.
*H04M 1/725* (2006.01)
*H04W 52/02* (2009.01)

(52) U.S. Cl.
CPC ...... *H04M 1/72594* (2013.01); *H04W 52/0254* (2013.01); *H04W 52/0267* (2013.01); *H04W 52/0274* (2013.01)

(58) Field of Classification Search
CPC ..... G06F 3/013; G06F 3/012; G06K 9/00597; G06K 9/00604
See application file for complete search history.

(56) References Cited

U.S. PATENT DOCUMENTS

| | | | | |
|---|---|---|---|---|
| 2010/0079508 | A1* | 4/2010 | Hodge | G06F 3/013 345/697 |
| 2013/0250825 | A1* | 9/2013 | Gosal | H04W 52/0232 370/311 |
| 2014/0085221 | A1* | 3/2014 | Kim | G06F 3/016 345/173 |

OTHER PUBLICATIONS

Verifying App Accessibility on iOS, Apple Developer, Apr. 2013 Apple Inc.; 17 pages.

* cited by examiner

*Primary Examiner* — Sharad Rampuria
*Assistant Examiner* — Farideh Madani

(57) ABSTRACT

A mobile device operates in a standard mode of operation, or operates in a visually impaired (VI) mode of operation designed for visually impaired users and in which a display screen of the mobile device is turned off by default. The display screen may thus remain turned off in the VI mode even when conditions under which the display screen is turned on in the standard mode are satisfied. The display screen may further remain turned off in the VI mode even when conditions under which a touch-screen input interface of the mobile device is turned on in either of the standard and VI modes. The mobile device may be configured to automatically transition from the VI mode to the standard mode in response to detecting a gaze directed towards the display screen.

15 Claims, 7 Drawing Sheets

MOBILE DEVICE MODE OF OPERATION FOR VISUALLY IMPAIRED USERS

BACKGROUND

Mobile devices such as smart-phones have increasingly large display screens. The display screen consumes a large amount of power, and operation of the display screen causes the battery of the mobile device to quickly become depleted. For example, a standard display panel for a mobile device can consume around 1 Watt of power when active with normal brightness. In order to reduce battery usage, the display screen is generally automatically dimmed and/or turned off after a short period of inactivity.

The user interfaces of mobile devices are heavily dependent on the display of information to users. Indeed, the user interfaces generally rely on touch-screen technology for receiving user input. In order to use touch-screen input, the display screen must be powered on to display content and virtual buttons for selection by the user, and to detect the user's touch on the screen. The display must thus generally be powered on at any time that information is displayed to the user, and any time that user input is expected from the user.

Visually impaired users of mobile devices, such as blind users, use the touch-screen interface of their mobile devices to interact with the mobile devices. Visually impaired users, however, may not generally require the display screen of their mobile devices to be powered on as they interact with the touch-sensitive input interface. A need therefore exists for enabling visually impaired users of mobile devices to power off the display screens of their mobile devices to as to reduce power consumption. The turning off of the display screen can additionally avoid other persons from viewing information normally displayed on the screen.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
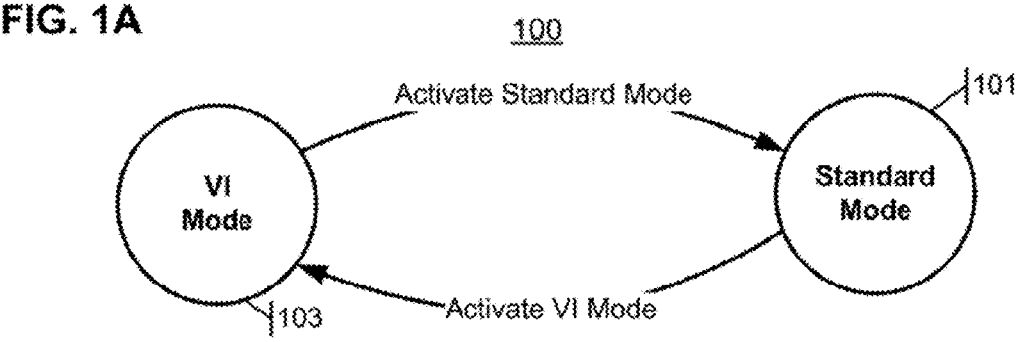
FIGS. 1A and 1B are state diagrams illustratively showing transitions between the various modes of operation of a mobile device.

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

The various methods and system disclosed herein relate to providing an operating mode for visually impaired users of mobile devices, such as an operating mode that keeps the display screen powered off by default in order to reduce the power consumption of the mobile devices.

Visually impaired persons use mobile devices, such as smart-phones, for a similarly wide range of uses as non visually impaired users. Visually impaired users commonly use mobile devices for placing and receiving phone calls, accessing applications and/or the Internet, and listening to music, podcasts, movies, or other audio or audio-visual content. Users, whether visually impaired or not, interact with and control the mobile devices through user input interfaces that commonly take the form of touch-screen input interfaces. In a touch-screen interface, information is displayed for the user on the display screen, and can include one or more buttons for receiving input from the user. In response to the user touching a touch-sensitive sensor overlaid on the display screen (or forming part of the screen), the touch-sensitive sensor detects the location of the user's touch, determines whether the detected location is associated with any button or other function, and performs the function associated with the activated button or determined function.

While non visually impaired users rely heavily on visual information displayed on a display screen of the mobile device in interacting with and obtaining information from the mobile device, blind users as well as certain other visually impaired users do not generally use the display screen in their interactions with the mobile device. For such users, the display screen is not needed when they interact with the mobile device, and the display screen thus unnecessarily consumes the limited power stored in the mobile device battery. In fact, the display screen may inadvertently enable other persons to view information displayed on the screen, and the display of content on the screen may thus present privacy concerns for visually impaired users.

A mobile device may thus advantageously enable the display screen of the mobile device to be turned off by default. The display screen may be turned off by default when the mobile device operates in a visually impaired (VI) mode of operation designed for visually impaired users, while the display screen operates normally when the mobile device operates in a standard mode of operation.

The mobile device is configured such that it can separately turn on the display screen and the touch-sensitive input interface. The mobile device can thus simultaneously turn both the display screen and the touch-sensitive input interface on or off, or the mobile device can turn one on while the other remains turned off. During operation in the standard mode, both the display screen and the touch-sensitive input interface are generally turned on or turned off concurrently. However, during operation in the VI mode, the display screen generally remains turned off—even when the touch-sensitive input interface is turned on.

A user of the mobile device can select whether the mobile device operates in the standard mode or in the VI mode, and can alternate between the modes of operation by selectively activating one mode or the other.

FIG. 1A is a state diagram 100 illustratively showing transitions between the various modes of operation of a mobile device. In particular, the state diagram 100 shows two modes of operation of the mobile device: the standard mode 101 and the VI mode 103. The standard mode 101 is the default mode of operation of the mobile device, such as the mode in which the device operates when first turned on (e.g., following production and/or installation of the operating system).

When operating in the standard mode 101, the display screen of the mobile device is powered and turned on under a variety of conditions. In general, in the standard mode 101, the display screen is turned on to display information to the user when a button or key of the mobile device is activated. For example, the display screen is turned on in the standard mode 101 in response to a user pressing a power button to boot-up the device (from being powered off). The display screen is further turned on in the standard mode 101 in response to a user pressing any button or key to wake-up the device (from being in an idle state). The display screen may also be turned on in the standard mode 101 in response to the device booting-up or waking-up automatically, such as in response to a scheduled reminder, timer, or other alarm. In each of these instances, the device is powered up from a low power state (e.g., an "off" state or an "idle" state, such as a locked, standby, or sleep state). In the low power state, the display screen is turned off. In response to being powered up from the low power state in the standard mode 101, the display screen is turned on. However, the display screen may turn off after a pre-determined period of inactivity (e.g., a period of 15 s during which no user input is received by the mobile device, or another user-selectable length of time) or in response to a user lock command, a user idle command (e.g., a sleep or lock command), or a power down command.

In general, in the standard mode 101, the touch-sensitive input interface is turned on and off at substantially the same times (and/or for substantially the same periods of time) as the display screen. Thus, the touch-sensitive input interface is generally turned on, and is active and ready to sense a user's touch command, whenever the display screen is turned on. Conversely, the touch-sensitive input interface is generally turned off, and cannot sense users' touch, whenever the display screen is turned off.

When the mobile device operates in the VI mode 103, the display screen of the mobile device remains turned off by default, such that it remains off (and powered down) at substantially all times. Thus, even when one of the conditions that trigger the display screen to be turned on in the standard mode 101 is satisfied, the display screen remains turned off in the VI mode 103. For example, the display screen is not turned on in the VI mode 103 in response to a user pressing a power button to boot-up the device (from being powered off). The display screen is further not turned on in the VI mode 103 in response to a user pressing any button or key to wake-up the device (from being in an idle state).

In the VI mode 103, however, the touch-sensitive input interface may nonetheless be turned on or activated under substantially the same conditions that trigger the display screen (and the touch-sensitive input interface) to be turned on in the standard mode 101. As such, in the VI mode 103, the touch-sensitive input interface is turned on and monitors for user touch input in response to a user pressing a power button to boot-up the device (from being powered off). The touch-sensitive input interface is further turned on in the VI mode 103 in response to a user pressing any button or key to wake-up the device (from being in an idle state). The touch-sensitive input interface may be turned back off after a pre-determined period of inactivity (e.g., a period of 15 s during which no user input is received by the mobile device) or in response to a user lock command, a user idle command (e.g., a sleep or lock command), or a power down command.

The display screen generally remains turned off in the VI mode 103, and displays no information to the user. In particular, in the VI mode 103, the display screen remains turned off even when a user is actively engaging with the touch-sensitive input interface.

Similarly to the standard mode 101, the mobile device can enter a low power state, such as a powered-off state or an idle state (e.g., a locked, standby, or sleep state), when operating in the VI mode 103. In the low power state, the display screen remains turned off while the touch-screen user interface is also turned off. The mobile device may enter the low power state when operating in the VI mode 103 in much the same ways as the device enters the low power state when operating in the standard mode 101. In particular, the device can enter a low power state after a pre-determined period of inactivity (e.g., a period of 15 s during which no user input is received by the mobile device) or in response to a user lock command, a user idle command (e.g., a sleep or lock command), or a power down command.

The standard mode 101 and VI mode 103 may further provide users with different user interfaces. In the case of the VI mode 103, for example, the user interface may be adjusted to provide enhanced non-visual forms of feedback to users. Thus, in the VI mode 103, screen reader software may be automatically turned on (or turned on by default) to cause text that would usually be displayed on the display screen to be read to users. The screen reader software may additionally provide audio descriptions of certain elements displayed on a screen, such as description of the positions of frames that would be displayed on the display screen if the display screen were turned on, or of virtual buttons that the user may activate on the touch-sensitive input interface (e.g., "OK button in lower left corner of screen; Cancel button in lower right corner of screen"). In contrast, screen reader software may be turned off by default when operating in the standard mode 101, and/or may not provide audio descriptions of non-text elements displayed on the screen.

In addition to audio feedback, operation in the VI mode 103 may provide enhanced haptic feedback. In one example, haptic feedback can be used to provide confirmation to a user that the user's selection of a virtual button through the touch-sensitive input interface was received, for instance by issuing a haptic pulse in response to and shortly after receiving the user's selection. In another example, haptic feedback can be used to provide confirmation that a user's finger contacting the touch-sensitive input interface is located above a frame, button, or icon, for instance by issuing a haptic vibration when the finger is located above the frame. In contrast, haptic feedback may generally be turned off by default when operating in the standard mode 101.

In the VI mode 103, the user interface of the mobile device may further automatically activate a spoken command input interface to enable the mobile device to receive input commands spoken by the user and received through a microphone. The spoken command input interface may be used to receive dictation from a user, and/or to receive commands for performing tasks on the mobile device (e.g., to select an icon, open a menu, or the like). The spoken command input interface may be deactivated by default in the standard mode 101.

As shown in state diagram 100, the mobile device can transition between the standard mode 101 and the VI mode 103 of operation in response to an activation of either mode by a user. Thus, when operating in the standard mode 101, the user may activate the VI mode to cause a transition into the VI mode 103. Conversely, when operating in the VI mode 103, the user may activate the standard mode to cause a transition into the standard mode 101.

When the mobile device operates in the VI mode 103, the display screen remains powered down at substantially all times. The display screen may nonetheless be activated at selected times and for limited purposes. For example, immediately following a boot-up or wake-up operation, the display screen may be temporarily activated for a limited period of time for the express purpose of providing a sighted user with a visual notification indicating that the mobile device is in the VI mode 103 (e.g., by displaying an on-screen pop-up notification indicating that the mobile device is in the VI mode). The notification can provide the user with an opportunity to activate a standard mode 101 (e.g., by displaying an on-screen prompt for activating the standard mode 101) and may indicate the amount of time remaining before the mobile device automatically enters VI mode 103 if the standard mode 101 is not activated by the user. During display of the visual indication and/or on-screen prompt, no other information is displayed on the display screen. The display screen may be turned off after a pre-determined limited period of time has elapsed.

Figure 1B:
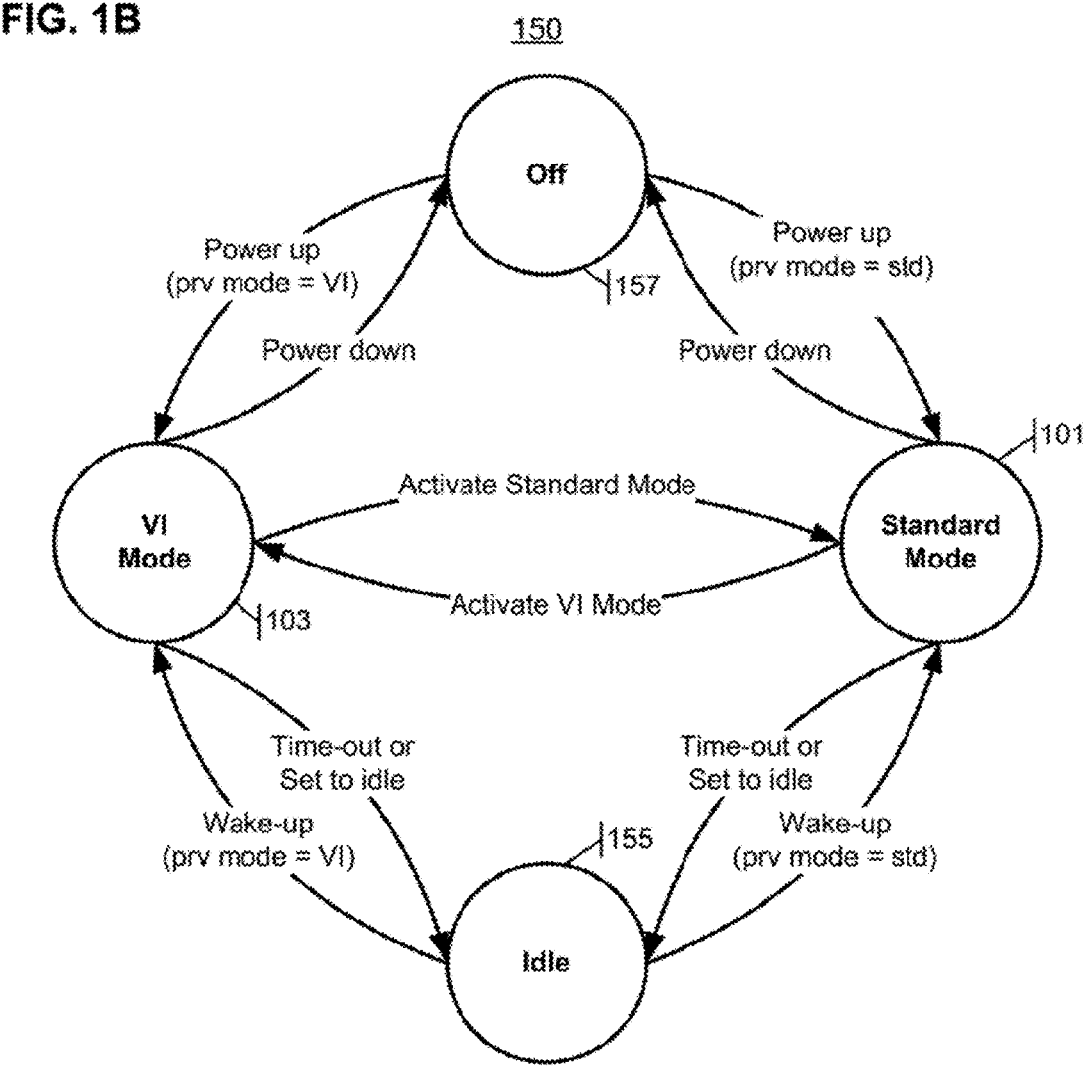

FIG. 1B is a second state diagram 150 illustratively showing transitions between the various modes of operation of a mobile device in more detail. In addition to the standard mode 101 and VI mode 103 shown in diagram 100, diagram 150 shows transitions into and out of the idle state 155 (e.g., a sleep, standby, or locked state) and the powered-off state 157.

As shown, the mobile device enters the idle state 155 from either the standard mode 101 or the VI mode 103 in response to a time-out or a command to set the mobile device to idle. In the idle state 155, both the display screen and the touch-sensitive input interface are turned off. The mobile device remains in the idle state 155 until an activating event is detected. An activating event may include a user pressing a key of the mobile device to cause the mobile device to be woken-up, an alarm being activated or a timer expiring, or the like. When the activating event is detected, the mobile device wakes-up and automatically determines the previous mode of operation in which the mobile device operated immediately prior to entering the idle state 155. In response to determining that the previous mode was the standard mode 101, the mobile device is woken-up and made to operate in the standard mode 101. In response to determining that the previous mode was the VI mode 103, the mobile device is woken-up and made to operate in the VI mode 103.

The mobile device can alternatively enter the powered-off state 157 from either the standard mode 101 or the VI mode 103 in response to a user's power-down command, a power-down trigger (e.g., a restart trigger), or a battery reaching a critically low level. In the powered-off state 157, the display screen, the touch-screen user interface, as well as all other parts of the mobile device are turned off. The mobile device remains in the powered-off state 157 until a power button is activated or a charging cable is connected. When the power button is activated or the charging cable is connected, the mobile device powers-up and automatically determines the previous mode of operation in which the mobile device operated immediately prior to powering down into the powered-off state 157. In response to determining that the previous mode was the standard mode 101, the mobile device is powered-up and made to operate in the standard mode 101. In response to determining that the previous mode was the VI mode 103, the mobile device is powered-up and made to operate in the VI mode 103.

In some examples, the mobile device operating in the VI mode may provide non-visual user interface features to users that are not generally available in the standard mode. For example, when operating in the VI mode, the mobile device may provide enhanced haptic feedback in response to touch input from users, provide alternate control methods based on hand gestures using the touch-sensitive input interface, on free-space gestures measured using an accelerometer and/or gyroscope mounted in the mobile device, and on voice recognition or the like. Operation in the VI mode may further cause audio triggering technology, such as a highly energy efficient audio-monitoring circuit that enables the mobile device to continuously monitor a microphone for voice commands uttered by a user, to be powered such that users can control the mobile device using oral commands.

Figure 2A:
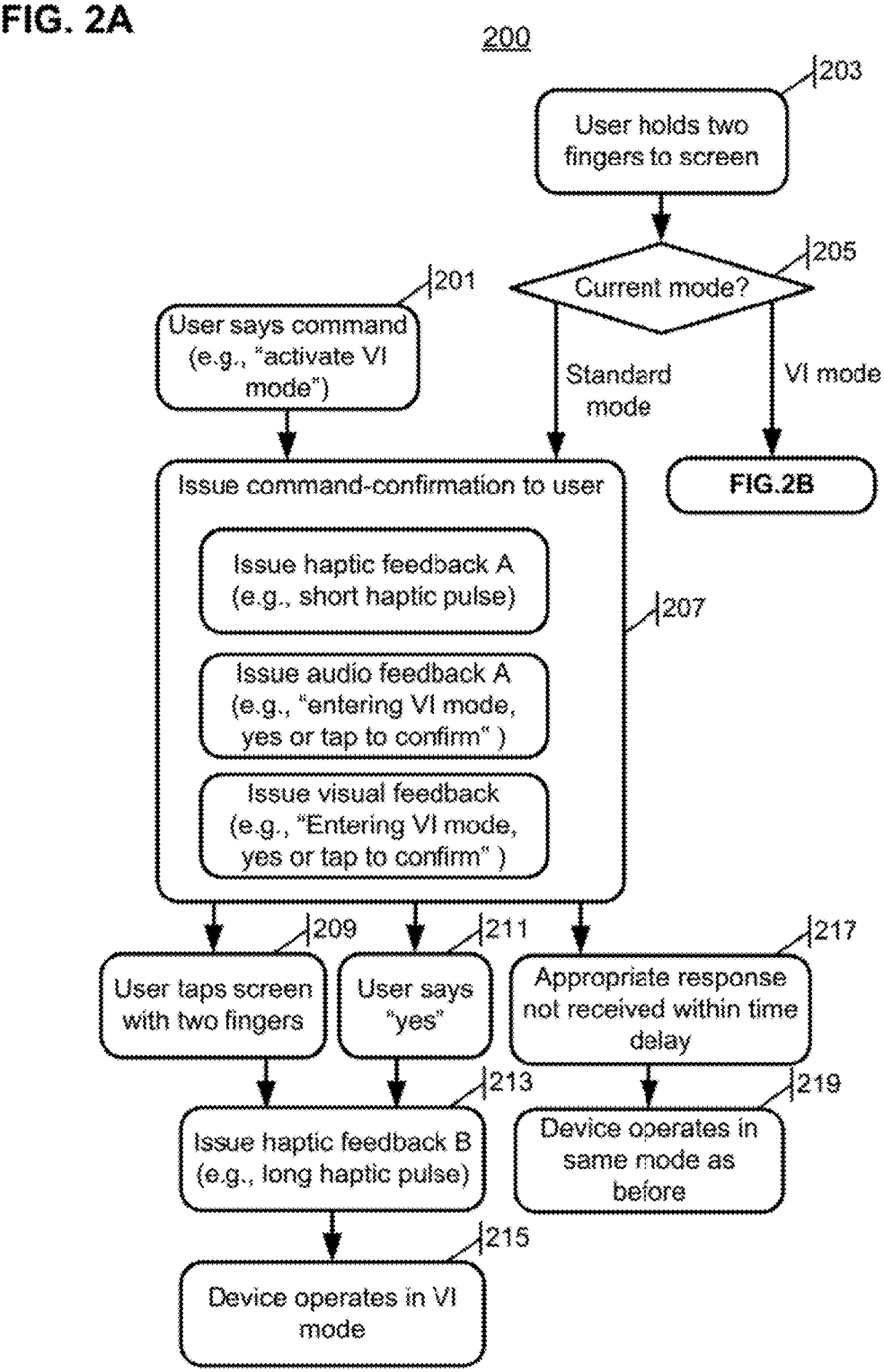
FIGS. 2A and 2B are flow diagrams illustratively showing processes for transitioning between modes of operation in a mobile device.
Figure 2B:
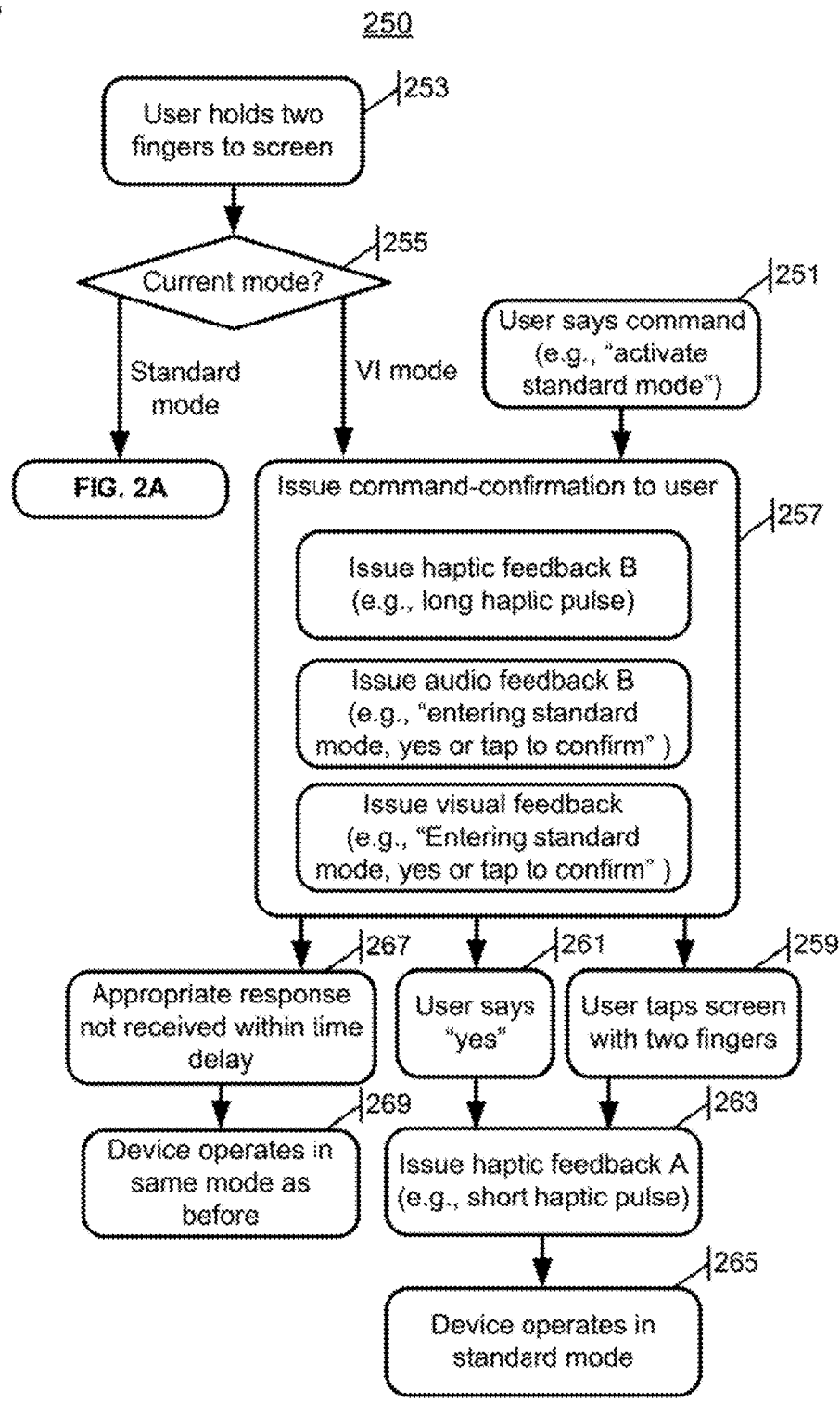

FIGS. 2A and 2B are flow diagrams illustratively showing processes for transitioning between modes of operation in a mobile device. The processes are illustrative and may correspond to processes that are pre-established in the mobile device. However, other processes (including user-defined processes) may alternatively be used to transition between modes of operation. FIG. 2A shows a method 200 for transitioning into the VI mode 103, while FIG. 2B shows a method 250 for transitioning into the standard mode 101.

In accordance with method 200, a user may begin a process for activating the VI mode 103 using a number of commands. The user may issue an oral command for activating the VI mode 103 as shown in operation 201, for example by saying a pre-determined phrase (e.g., "activate VI mode") while the mobile device is listening for the pre-determined phrase. The user may alternatively issue a pre-determined gesture command through the touch-screen user interface of the mobile device as shown in operation 203, such as a two-finger hold gesture (e.g., by holding two adjacent fingers stationary on the screen for 3 s) or other multi-finger gesture. The user may alternatively access a setup menu of the mobile device in order to select a menu option for changing the operating mode of the mobile device, or use a motion-based command (e.g., by performing a pre-determined hand motion while holding the mobile device, such as by gently shaking the mobile device in a horizontal plane for 2 s) in order to change the operating mode. In some situations, in response to receiving the user command for changing the operating mode, the mobile device may determine a current mode of operation of the mobile device (operation 205). Based on the determination, the mobile device may either proceed with operation 207 of method 200 if the current mode is the standard mode 101, or with operation 257 of method 250 (shown in FIG. 2B) if the current mode is the VI mode 103.

In operation 207, the mobile device seeks confirmation from the user regarding the request for changing the mode of operation. As part of seeking user confirmation, the mobile device provides feedback to the user indicating that the request has been received, and prompting the user for confirmation. The feedback can take various forms. As shown, one or more of haptic, audio, and visual feedback can be used. For example, a short haptic pulse can be issued, an auditory notification can be issued (e.g., "entering VI mode, say yes or tap screen to confirm"), and/or a pop-up notification can be issued (e.g., a prompt for "Entering VI mode, select yes or tap to confirm"). Note that the haptic and audio feedback enable visually impaired users to be apprised of impending changes in operating mode.

If the user issues a confirmation command, for example by tapping the touch-screen user interface with two fingers (operation 209) or saying a pre-determined command (operation 211) before a pre-determined time period has lapsed, the mobile device proceeds to issue a final confirmatory haptic feedback in operation 213 (e.g., a long haptic pulse) before changing the operation mode of the mobile device to the VI mode (operation 215). Alternatively or additionally, a motion-based command can be used to issue the confirmation command (e.g., in operation 209 or 211), and audio feedback can be used instead of or in addition to haptic feedback in operation 213 (e.g., in the form of a tone descending in frequency). If no confirmation command is received within the pre-determined time period (operation 217), or if a command to cancel the change in modes is received from the user, the mobile device does not change mode of operation and instead continues to operate in the standard mode (operation 219).

In accordance with method 250 of FIG. 2B, a user of the mobile device can activate a transition back into the standard mode of operation using a similar process. The user may issue an oral command for activating the standard mode 101 as shown in operation 251, issue a pre-determined gesture command (e.g., a two finger hold) as shown in operation 253, access an appropriate setup menu of the mobile device, or issue a pre-determined motion command (e.g., shaking the mobile device in a horizontal plane for 2 s). In some situations, in response to receiving the user command for changing the operating mode, the mobile device determines a current mode of operation of the mobile device (operation 255) so as to determine whether to proceed with operation 257 of method 250 (e.g., if the current mode is the VI mode 103) or operation 207 of method 200 (e.g., if the current mode is the standard mode 101).

In operation 257, the mobile device seeks confirmation from the user regarding the request for changing the mode of operation. As part of seeking user confirmation, the mobile device provides haptic, audio, or visual feedback to the user so as to prompt the user for confirmation. Operation 257 may include turning on the display screen to provide the visual feedback. If the user issues a confirmation command, for example by tapping the touch-screen user interface with two fingers (operation 259) or saying a pre-determined command (operation 261) before a pre-determined time period has lapsed, the mobile device proceeds to issue a final confirmatory haptic feedback in operation 263 before changing the mode of operation of the mobile device to the standard mode (operation 265). Alternatively or additionally, a motion-based command can be used to issue the confirmation command (e.g., in operation 259 or 261), and audio feedback can be used instead of or in addition to haptic feedback in operation 263 (e.g., in the form of a tone ascending in frequency). If no confirmation command is received within the pre-determined time period (operation 267), or if a command to cancel the change in modes is received from the user, the mobile device does not change operation mode and instead continues to operate in the VI mode (operation 269).

Figure 3A:
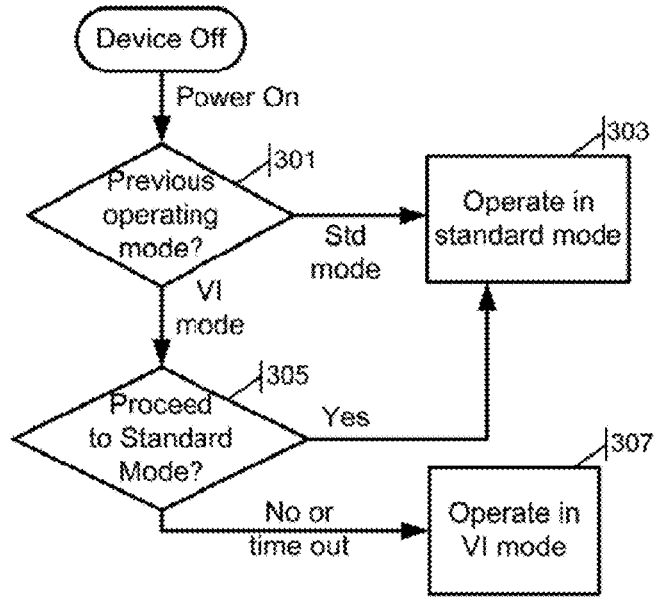
FIG. 3A is a flow diagrams illustratively showing operations that may be performed when a mobile device powers up from a powered-off state into the standard mode or the VI mode of operation.

FIG. 3A is a flow diagram 300 illustratively showing operations that may be performed when a mobile device powers up from a powered-off state into the standard mode 101 or the VI mode 103. In diagram 300, the mobile device powers up and determines the previous mode of operation in which the mobile device operated immediately prior to powering down (operation 301). In response to determining that the previous mode was the standard mode, the mobile device is powered-up and made to operate in the standard mode (operation 303). In response to determining that the previous mode was the VI mode, the mobile device is powered-up and the display screen is turned on. The mobile device displays a temporary prompt in operation 305 notifying a user that the device is being powered-up and made to operate in the VI mode. The notification can provide the user with an option for causing the device to power-up and be made to operate in the standard mode instead. If no user input is received in response to the prompt, the VI mode is activated in operation 307 and the display screen is turned off. However, if the user selects the option for powering the device up in the standard mode in operation 305, the mobile device proceeds to operation 303 and operates in the standard mode.

In some embodiments, the mobile device may be configured to enable a user to temporarily turn on the display screen when operating in the VI mode. In one example, the temporary turning on of the display screen may enable a visually impaired user to show pictures or other visual content to a non-visually impaired user (e.g., a friend or family member), and/or to seek assistance in operating the mobile device from a non-visually impaired user (e.g., a friend, or technical support person). In general, following the display screen being temporarily turned on in the VI mode, the display screen remains turned on until a user command to turn off the display screen is received, or until the mobile device enters a low power state (e.g., idle or off state), whichever occurs first. In one example, the display screen may remain turned on for a pre-determined or user-selected period (e.g., 3 minutes) following receipt of a command to temporarily turn on the display screen, and may automatically be turned off at the end of the pre-determined or user-selected period unless a follow-on user request to maintain the display screen temporarily turned on is received.

Figure 3B:
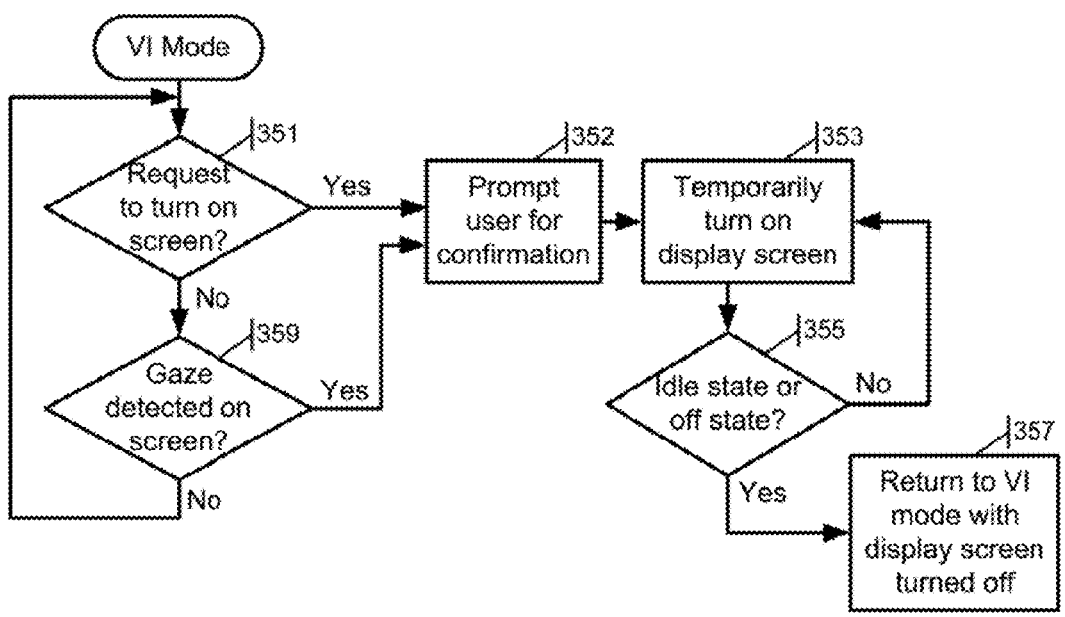
FIG. 3B is a flow diagram illustratively showing operations that may be performed when a mobile device operating in the VI mode receives a user command to turn on the display screen.

FIG. 3B is a flow diagram 350 illustratively showing operations that may be performed when a mobile device operating in the VI mode receives a user command to turn on the display screen. In diagram 350, the mobile device operating in the VI mode is operative to turn on the display screen under various conditions. In one situation, the mobile device can turn on the display screen in response to receiving a request or command from a user to turn on the display screen (operation 351). The request can come in the form of an oral command (e.g., "turn display on"), a pre-determined gesture command (e.g., a three-finger hold gesture in which three adjacent fingers are held stationary on the screen for 3 s), or by accessing a corresponding menu option of the mobile device. In response to the request, the mobile device may prompt the user for confirmation that the user wants to turn on the display screen (operation 352), for example by issuing one or more of an audio, visual, or haptic notification and waiting for confirmation from the user (e.g., using operations similar to operations 207-213 of FIG. 2A). If the user confirms the request, the display screen in temporarily turned on (operation 353) while the device continues to operate in the VI mode. Note that the display screen is only temporarily turned on. As such, as soon as the mobile device enters an idle state or a powered-off state (operation 355), or as soon as the display screen is otherwise caused to be turned off, the display screen returns to its default operating mode of being turned off while the mobile device operates in the VI mode (operation 357). The user can once again temporarily turn on the display screen by repeating operation 351. Additionally, when the display screen is temporarily turned on, the user can turn off the display screen by speaking an oral command (e.g., "turn display off"), a pre-determined gesture command (e.g., the three-finger hold gesture), or by accessing a corresponding menu option of the mobile device.

In another situation, the mobile device can turn on the display screen in response to automatically determining a need for the display screen (operation 359), such as by detecting that a gaze is directed towards the display screen of the mobile device. In this situation, the mobile device may continuously monitor whether a gaze of a user of the mobile device is directed towards the display screen of the mobile device when the mobile device operates in the VI mode, for example by using a forward facing camera of the mobile device that tracks eyes (and/or irises, pupils, or glints in eyes) of users looking at the display screen. When a gaze is detected as being directed towards the display screen and is detected to be sustained (e.g., a gaze that is steadily directed at the display screen for at least a 2 s period or another predetermined length of time), the mobile device may prompt the user for confirmation that the user wants to turn on the display screen (operation 352). The prompt may be an audio prompt to which the user can respond through a spoken command or selection of a response option on the touch-sensitive input interface. The prompt can alternatively be a visual prompt displayed on the display screen after temporarily turning on the display screen, and including response option buttons displayed on the screen for selection using the touch-sensitive user interface. If confirmation is received, the mobile device proceeds with operations 353-357 as described above.

In some examples, the mobile device monitors whether a gaze of a user is directed towards the display screen (or monitors for triggers used in automatically turning on the display screen) under specified circumstances. For instance, the mobile device may only monitor for users' gazes when particular applications are currently active on the mobile device. An application is currently active on the mobile device if the application is running on the device and is controlling the user interface of the device (e.g., the application is actively running on the mobile device rather than running in the background, and the mobile device is not operating in a low power state). A currently active application can, for example, be an application that a user of the mobile device has activated by selecting an icon for the application on the mobile device's home screen. In one example, the particular applications may be applications that are inherently associated with visual content, such that the mobile device monitors for user gazes only when applications that are inherently associated with visual content, such as photo viewing/sharing applications, video players, or the like, are actively being used on the mobile device. Conversely, in the example, the mobile device may not monitor for user gazes when non-visual applications, such as an audio-book reader, a music or radio player, or the like, are in active use. The particular applications may be applications included in a pre-determined list of applications compatible with the automatic turning on of the display screen when a sustained gaze is detected (e.g., such as applications that are inherently associated with visual content in the example above), and/or a list of user-selected applications among the applications that are installed on the mobile device.

In another example, the mobile device can turn on the display screen in response to automatically determining a need for the display screen when operating in the VI mode (operation 359) such as determining that an application that is inherently associated with visual content is active on the mobile device, whether or not a gaze is detected. In the other example, the prompt (operation 352) may be provided to the user only after the application has been active for a predetermined period of time (e.g., 5 seconds), such that the prompt is not provided when an application is erroneously activated and is promptly de-activated by the user.

Conversely, the mobile device can automatically transition from the standard mode to the VI mode so as to turn off the display screen in response to automatically determining that the display screen may pose a distraction to a user when the mobile device operates in the standard mode. For example, the mobile device may determine that a user is driving or otherwise engaging in an activity in which visual distractions should be minimized. The determination can, in one example, be based on determining that an application that is associated with driving (e.g., an application providing turn-by-turn driving directions to a user of the mobile device) is active on the mobile device. The determination can further be based on sensor input (e.g., a sensor determining that the mobile device is docked in a vehicle-dock). The automatic transition from the standard mode to the VI mode may activate a screen reader or other audio-based interface in addition to turning off the display screen.

In an alternate embodiment, in response to detecting that a gaze is directed towards the display screen of the mobile device (e.g., as in operation 359), the mobile device can initiate a change in operating mode of the mobile device. In this situation, the mobile device initiates a change of mode from the VI mode to the standard mode, for example by prompting the user for confirmation that the user wants to change the mode of operation (e.g., similarly to operations 257-265 of FIG. 2B) prior to proceeding with operation in the standard mode upon receiving confirmation, or reverting to the VI mode if no confirmation is received.

FIGS. 4A-4G are illustrations of mobile devices operating in different modes of operation, and receiving user commands for changing the mode of operation of the mobile device.

Figure 4A:
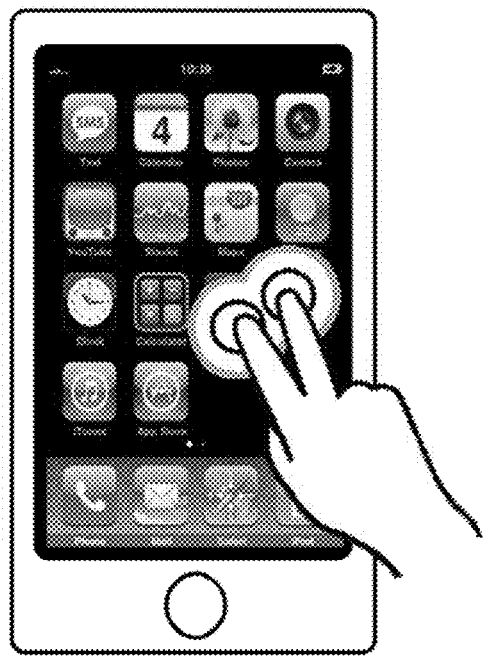
FIGS. 4A-4G are illustrations of mobile devices operating in different modes of operation, and receiving user commands for changing the mode of operation of the mobile device.
Figure 4B:
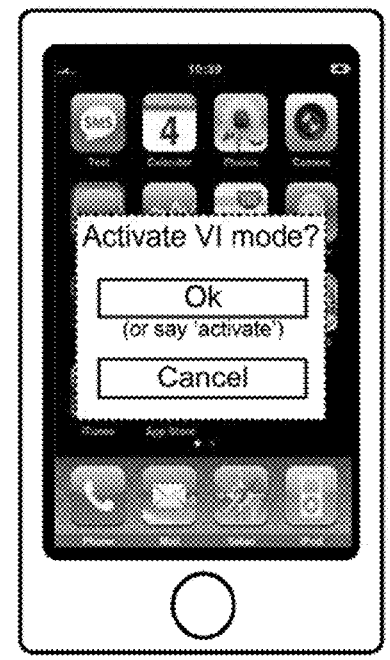

FIG. 4A shows a mobile device operating in the standard mode of operation in which the display screen is powered on and displaying a home screen. While operating in the standard mode, a user touches the touch-screen user interface with a two-finger hold gesture in order to initiate the activation of the VI mode (e.g., as in operation 203 of FIG. 2A). In response to the two-finger hold gesture, the mobile device displays a confirmation screen shown in FIG. 4B prompting the user for confirmation of the command to activate the VI mode (e.g., as in operation 207). In response to the user selecting an "Ok" option or saying the command "Activate", the mobile device transitions to the VI mode (e.g., as in operation 215). Alternatively, the user can select a "Cancel" option or wait a predetermined time-out period to remain in the standard mode (e.g., as in operation 219).

Figure 4C:
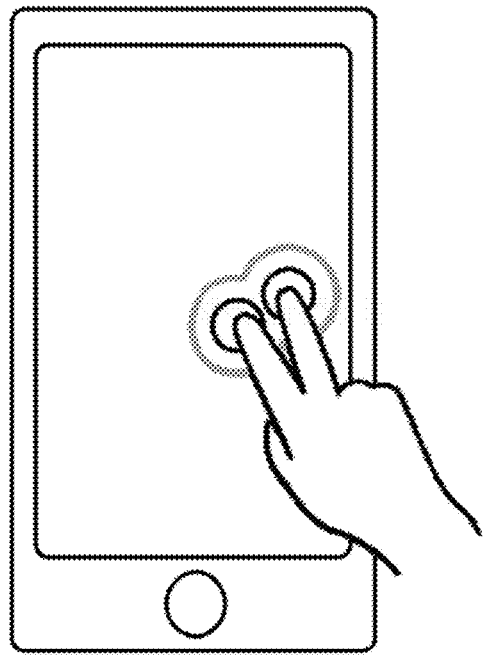
Figure 4D:
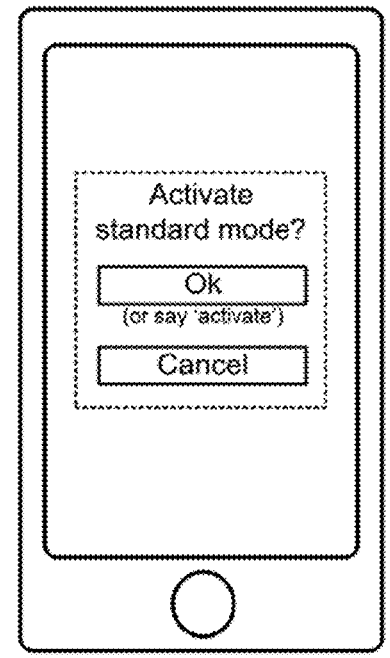

FIG. 4C shows a mobile device operating in the VI mode of operation in which the display screen is powered off but the touch-screen user interface is nonetheless powered up and active. While operating in the VI mode, the user touches the touch-screen user interface with a two-finger hold gesture in order to initiate the activation of the standard mode (e.g., as in operation 253 of FIG. 2B). In response to the two-finger hold gesture, the mobile device activates the display screen to display the confirmation screen shown in FIG. 4D (e.g., as in operation 257). The display screen of FIG. 4D prompts the user for confirmation of the command to activate the standard mode. The user can select an "Ok" option or say the command "Activate" in order to transition to the standard mode (e.g., as in operation 265) and cause the mobile device to display content on the display screen. Alternatively, the user can select a "Cancel" option or wait a predetermined time-out period to remain in the VI mode (e.g., as in operation 269) and cause the display screen to be powered back off.

Figure 4E:
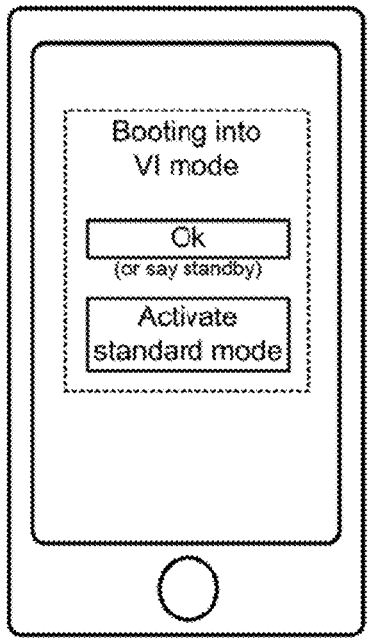

FIG. 4E shows a mobile device being powered up from a powered-off state. The mobile device has determined that it should power-up in the VI mode, for example in response to determining that the mobile device was operating in the VI mode immediately before being powered off (e.g., as in operation 301 of FIG. 3A). As part of the powering-up process, the mobile device turns on the display screen so as to display a prompt thereon (e.g., as in operation 305). As shown in FIG. 4E, the mobile device displays a temporary prompt notifying a user (e.g., sighted user) that the device is being powered up in the VI mode. The prompt provides an option for powering the device up in the standard mode instead. If no user input is received in response to the prompt, the VI mode is activated (e.g., as in operation 307) and the display screen in turned off. However, if user input for activating the standard mode is received, the mobile device can activate the standard mode instead of the VI mode (e.g., as in operation 303).

Figure 4F:
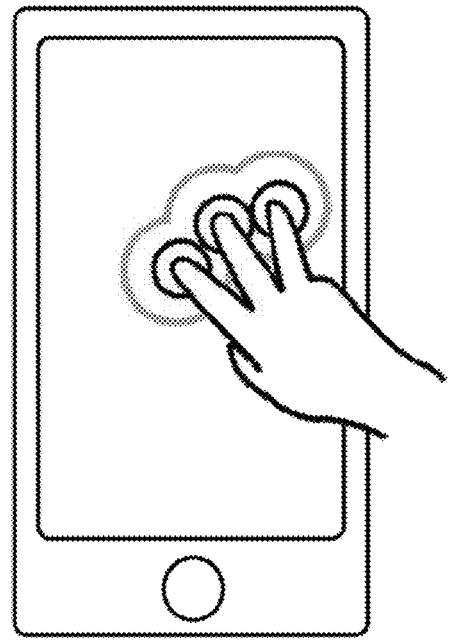

FIG. 4F shows a mobile device operating in the VI mode of operation in which the display screen is powered off but the touch-screen user interface is nonetheless powered up and active. While operating in the VI mode, the user touches the touch-screen user interface with a three-finger hold gesture in order to initiate the temporary turning on of the display screen (e.g., as in operations 351-357 of FIG. 3B). In response to the three-finger hold gesture, the mobile device activates the display screen to display a confirmation screen (not shown) prompting the user to confirm the request to temporarily turn on the display screen (e.g., as in operation 352).

Figure 4G:
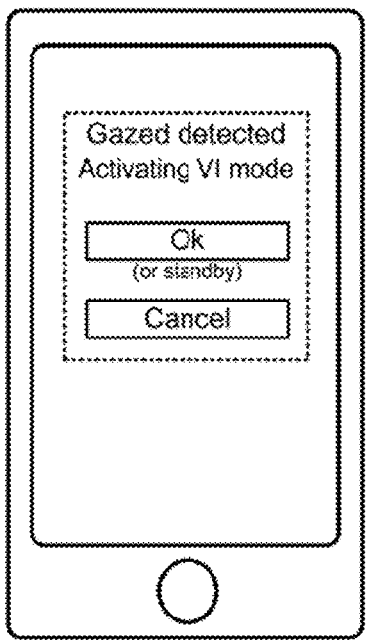

FIG. 4G illustrates a mobile device operating in the VI mode of operation and having detected a gaze directed towards the display screen of the mobile device (e.g., as in operation 359 of FIG. 3B). In response to monitoring for and detecting the gaze, the mobile device activates the display screen to display the confirmation prompt of FIG. 4G prompting the user to confirm whether the display screen should be temporarily turned on (e.g., as in operation 352).

Figure 5:
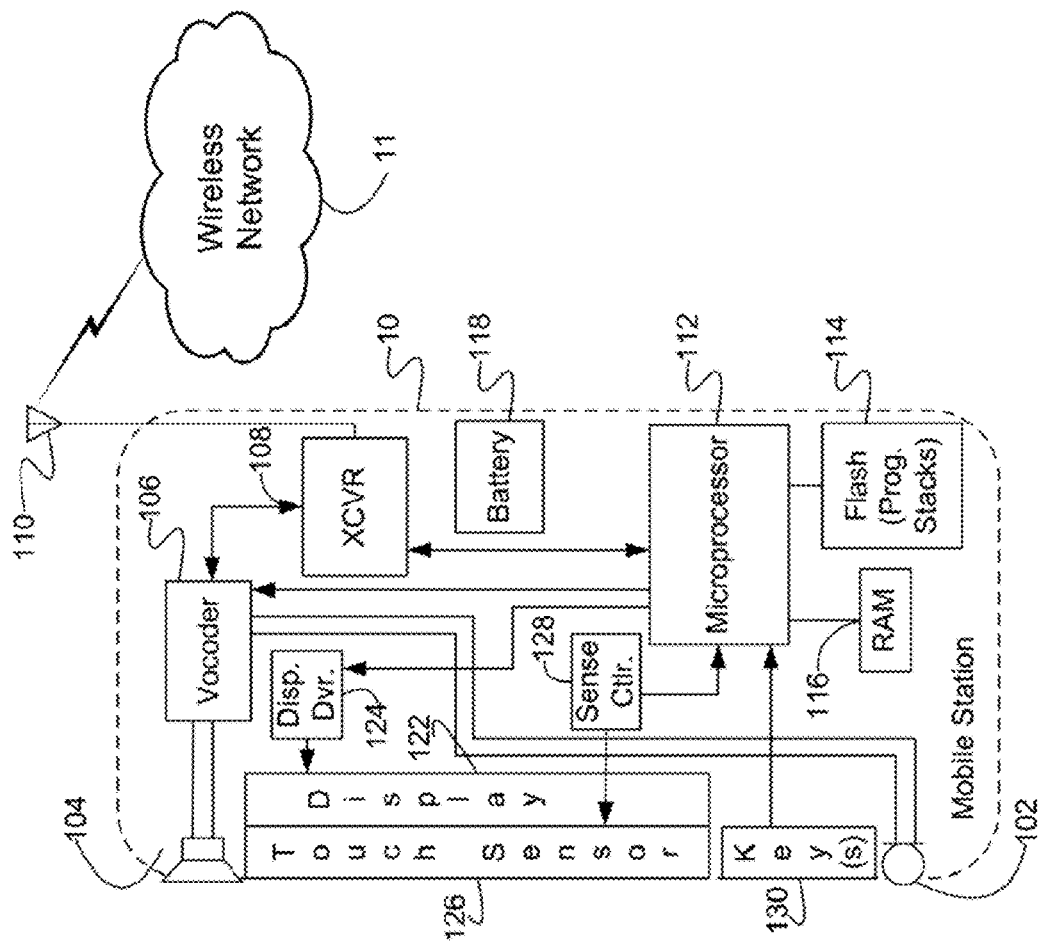
FIG. 5 is a high-level functional block diagram of an exemplary mobile device as may operate in the standard and VI modes of operation.

FIG. 5 provides a block diagram illustration of an exemplary mobile device 10. Although the mobile device 10 may be a smart-phone, a tablet computer, or may be incorporated into another device such as a personal digital assistant (PDA) or the like, for discussion purposes the illustration shows the mobile device 10 in the form of a handset. The mobile device 10 is powered by a battery 118, and is operative to communicate wirelessly with a network 11 such as a mobile wireless communication network (e.g., a cellular communication network), a Wifi network, or the like.

The handset embodiment of the mobile device 10 functions as a normal digital wireless telephone station. For that function, the device 10 includes a microphone 102 for audio signal input and a speaker 104 for audio signal output. The microphone 102 and speaker 104 connect to voice coding and decoding circuitry (vocoder) 106.

For digital wireless communications, the device 10 also includes at least one digital transceiver (XCVR) 108 connected to an antenna 110. Today, the device 10 can be configured for digital wireless communications using one or more of the common network technology types. The transceiver 108 provides two-way wireless communication of information, such as vocoded speech samples and/or digital information, in accordance with the technology of the network 11. The transceiver 108 also sends and receives a variety of signaling messages in support of the various voice and data services provided via the mobile device 10 and the communication network 11. In some examples, in addition to a transceiver 108 configured for communication through a mobile wireless communication network (e.g., a GSM, 3G, 4G, or LTE network, or the like), an additional transceiver is connected to a separate antenna to provide communication capabilities through a different type of network such as a Wifi network.

The mobile device 10 includes a display 122, which the microprocessor 112 controls via a display driver 124, to present visible outputs to the device user. The device 10 also includes a touch/position sensor 126 comprising the touch-sensitive input interface. The touch-sensitive sensor 126 is relatively transparent, so that the user may view the information presented on the display 122 through the sensor 126. A sense controller circuit 128 senses signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly a limited number of keys 130, if included) are the physical elements providing the textual and graphical user interface for the mobile device 10. The microphone 102 and speaker 104 may be used as additional user interface elements, for audio input and output.

The microprocessor 112 is operative to selectively and separately turn on or off the display 122 and the touch sensor 126. The microprocessor 112 can thus turn on both the display 122 and the touch sensor 126, turn off both the display 122 and the touch sensor 126, turn on the display 122 while turning off the touch sensor 126, or turn off the display 122 while turning on the touch sensor 126. The turning on and off of one or more of the display 122 and the touch sensor 126 can include sending a command to the one or more of the display 122 and touch sensor 126 to cause the respective element to turn off. Alternatively, the turning on and off of one or more of the display 122 and the touch sensor 126 can include removing power from the one or more of the display 122 and the touch sensor 126, for example by opening or closing a switch providing power to the display 122 or a switch providing power to the touch sensor 126. In general, when the display driver 124 is turned on and off concurrently with the display 122, while the sense controller circuit 128 is turned on and off concurrently with the touch sensor 126.

The microprocessor 112 serves as a programmable controller for the mobile device 10, in that it controls all operations of the mobile device 10 in accord with programming that it executes, for all normal operations, and for operations involved in activating and operating in each of the standard and VI modes of operation under consideration here. In the example, the mobile device 10 includes flash type program memory 114, for storage of various "software" or "firmware" program routines and mobile configuration settings. The mobile device 10 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, and any of a wide variety of other applications, such as client browser software and short message service software. The memories 114, 116 also store various data, such as server addresses, downloaded data such as multimedia content, and various data input by the user. Programming stored in the flash type program memory 114, sometimes referred to as "firmware," is loaded into and executed by the microprocessor 112.

As outlined above, the mobile device 10 includes a processor, and programming stored in the flash memory 114 configures the processor so that the mobile station is capable of performing various desired functions, including in this case the functions involved in activating and operating in each of the standard and VI modes of operation.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
providing two modes of operation for a mobile device including a standard mode and a visually impaired (VI) mode, wherein the VI mode is a mode of operation for visually impaired users of the mobile device in which the mobile device provides a plurality of enhanced non-visual forms of feedback to the users, where at least one of the plurality of enhanced non-visual forms of feedback is not available in the standard mode;
upon the mobile device powering up from a low power state, automatically determining a mode of operation for the mobile device among the standard mode and the VI mode;
operating the mobile device in the automatically determined mode of operation, wherein operating the mobile device in the VI mode includes operating the mobile device with a display screen of the mobile device turned off by default;
during operation of the mobile device in the VI mode, receiving a user command to temporarily turn on the display screen; and
in response to receiving the user command, turning on the display screen of the mobile device and displaying content to the user on the display screen;
wherein the receiving the user command to temporarily turn on the display screen comprises detecting a pre-determined multi-finger gesture on a touch-sensitive input interface of the mobile device.

2. The method of claim 1, wherein operating the mobile device in the standard mode includes turning on the display screen of the mobile device in response to a set of conditions, and operating the mobile device in the VI mode includes leaving the display screen of the mobile device turned off in response to the set of conditions.

3. The method of claim 2, wherein the display screen of the mobile device and a touch-screen input interface of the mobile device are turned on in response to the set of conditions during operation of the mobile device in the standard mode, and the display screen remains turned off while the touch-screen input interface is turned on in response to the set of conditions during operation of the mobile device in the VI mode.

4. The method of claim 1, wherein the automatically determining the mode of operation of the mobile device comprises determining a mode in which the mobile device operated immediately prior to entering the low power state.

5. The method of claim 1, wherein upon determining the mode of operation of the mobile device to be the VI mode, performing steps of:
temporarily turning on the display screen of the mobile device, and displaying a user notification on the display screen for a pre-determined period of time; and
turning off the display screen upon determining that no user command is received to activate the standard mode within the pre-determined period of time.

6. The method of claim 1, wherein upon determining the mode of operation of the mobile device to be the VI mode, performing steps of:
turning on the display screen of the mobile device, and displaying a user notification on the display screen for a pre-determined period of time; and
operating the device in the standard mode in response to receiving a user command to activate the standard mode within the pre-determined period of time.

7. A method comprising:
providing two modes of operation for a mobile device including a standard mode and a visually impaired (VI) mode, wherein in the VI mode the mobile device provides a plurality of enhanced non-visual forms of feedback to users of the mobile device, where at least one of the plurality of enhanced non-visual forms of feedback is not available in the standard mode, and wherein a display screen of the mobile device is turned off by default during operation in the VI mode;

operating the mobile device in a user-selected mode of operation, wherein operating the mobile device in a user-selected VI mode includes:

receiving a user command to temporarily turn on the display screen;

in response to receiving the user command, turning on the display screen of the mobile device and displaying content to the user on the display screen, wherein the receiving the user command to temporarily turn on the display screen comprises detecting a pre-determined multi-finger gesture on a touch-sensitive input interface of the mobile device;

monitoring, using a forward facing camera of the mobile device, whether a gaze of a user of the mobile device is directed towards the display screen of the mobile device; and upon detecting that the gaze is directed towards the display screen for a predetermined amount of time, initiating a change in mode of operation of the mobile device to the standard mode.

8. The method of claim 7, wherein the initiating the change in mode of operation of the mobile device comprises:

determining whether an application that is currently active on the mobile device is included in a pre-determined list of applications for which a change in mode of operation can be automatically initiated; and turning on the display screen of the mobile device in response to detecting that the gaze is directed towards the display screen and that the application that is currently active on the mobile device is included in the pre-determined list.

9. The method of claim 7, wherein the initiating the change in mode of operation comprises:

temporarily turning on the display screen of the mobile device in response to detecting that the gaze is directed towards the display screen, and displaying a user notification on the display screen for a pre-determined period of time; and cancelling the change in mode of operation of the mobile device and turning off the display screen upon determining that the user does not wish to activate the standard mode.

10. A mobile device comprising:

a display screen operative to display information to a user of the mobile device;

a touch-screen user interface operative to receive touch input from the user of the mobile device;

a memory; and a processor operative to execute machine-readable instructions stored in the memory to cause the mobile device to perform functions including functions to:

provide two modes of operation for the mobile device including a standard mode and a visually impaired (VI) mode, wherein the VI mode is a mode of operation for visually impaired users of the mobile device in which the mobile device provides a plurality of enhanced non-visual forms of feedback to the user, where at least one of the plurality of enhanced non-visual forms of feedback is not available in the standard mode;

upon the mobile device powering up from a low power state, automatically determining a mode of operation for the mobile device among the standard mode and the VI mode;

operating the mobile device in the automatically determined mode of operation, wherein operating the mobile device in the VI mode includes operating the mobile device with the display screen of the mobile device turned off by default;

during operation of the mobile device in the VI mode, receive a user command to temporarily turn on the display screen; and in response to receiving the user command, turn on the display screen of the mobile device and display content to the user on the display screen;

wherein the receiving the user command to temporarily turn on the display screen comprises detecting a pre-determined multi-finger gesture on a touch-sensitive input interface of the mobile device.

11. The mobile device of claim 10, wherein operating the mobile device in the standard mode includes turning on the display screen of the mobile device in response to a set of conditions, and operating the mobile device in the VI mode includes leaving the display screen of the mobile device turned off in response to the set of conditions.

12. The mobile device of claim 11, wherein the display screen of the mobile device and the touch-screen input interface of the mobile device are turned on in response to the set of conditions during operation of the mobile device in the standard mode, and the display screen remains turned off while the touch-screen input interface is turned on in response to the set of conditions during operation of the mobile device in the VI mode.

13. The mobile device of claim 10, wherein the automatically determining the mode of operation of the mobile device comprises determining a mode in which the mobile device operated immediately prior to entering the low power state.

14. The mobile device of claim 10, wherein upon determining the mode of operation of the mobile device to be the VI mode, the processor causes the mobile device to perform functions to:

temporarily turn on the display screen of the mobile device, and display a user notification on the display screen for a pre-determined period of time; and turn off the display screen upon determining that no user command is received to activate the standard mode within the pre-determined period of time.

15. The mobile device of claim 10, wherein upon determining the mode of operation of the mobile device to be the VI mode, the processor causes the mobile device to perform functions to:

turn on the display screen of the mobile device, and display a user notification on the display screen for a pre-determined period of time; and operate the device in the standard mode in response to receiving a user command to activate the standard mode within the pre-determined period of time.

* * * * *